United States Patent [19]

Huebner

[11] 4,120,796

[45] Oct. 17, 1978

[54] VERTICAL FLOW INCLINED PLATE CLARIFIER

[76] Inventor: Werner P. E. Huebner, 6 Sweetbriar Ct., Toronto, Ontario, Canada, M4A 2G5

[21] Appl. No.: 773,436

[22] Filed: Mar. 1, 1977

[51] Int. Cl.² .............................................. B01D 21/00
[52] U.S. Cl. .................................................. 210/522
[58] Field of Search ........................... 210/521, 522, 83

[56] References Cited

U.S. PATENT DOCUMENTS

| | | | |
|---|---|---|---|
| 3,182,799 | 5/1965 | Krofta | 210/83 |
| 3,272,343 | 9/1966 | Caldwell | 210/521 |
| 3,494,475 | 2/1970 | Hedström et al. | 210/521 |
| 3,552,554 | 1/1971 | Olgard | 210/521 X |
| 3,886,064 | 5/1975 | Kosonen | 210/522 X |

*Primary Examiner*—William A. Cuchlinski, Jr.

*Attorney, Agent, or Firm*—Fitch, Even, Tabin & Luedeka

[57] ABSTRACT

An inclined plate clarifier, adapted for generally vertical flow of liquid to be clarified through inclined flow passages formed by parallel spaced apart plates, includes flow regulating channel means arranged at either or both inclined ends of the flow passages to assist in regulating liquid flow in the passages. Influent for the clarifier is preferably introduced through a separate influent chamber which is in communication with a sediment collection chamber to permit settled solids at the bottom of the influent chamber to pass directly into the sediment collection chamber, inclined plates also being arranged within the influent chamber to facilitate flow distribution and the settling of solids therein. Slave plates are also disclosed for insertion between relatively fixed clarifier plates in order to provide an increased number of narrower inclined flow passages.

16 Claims, 10 Drawing Figures

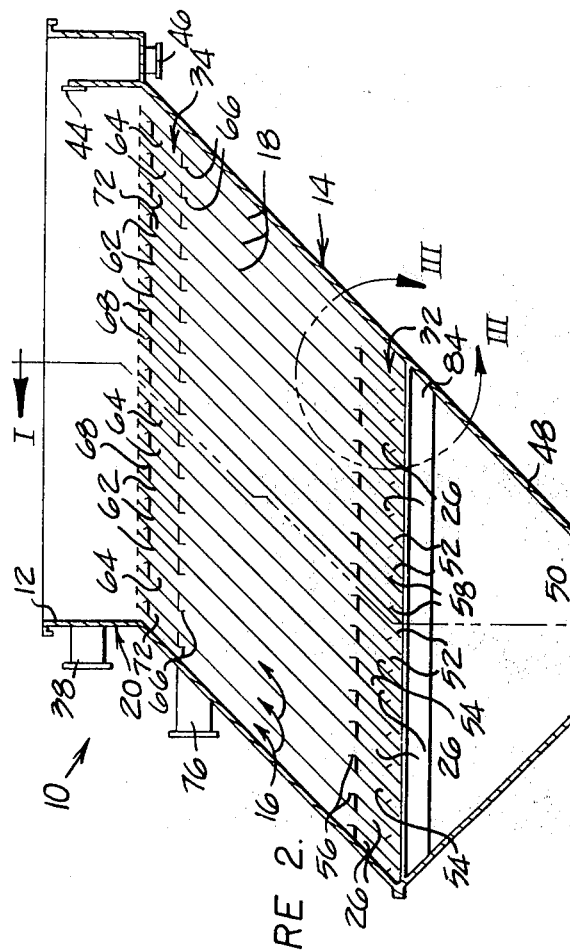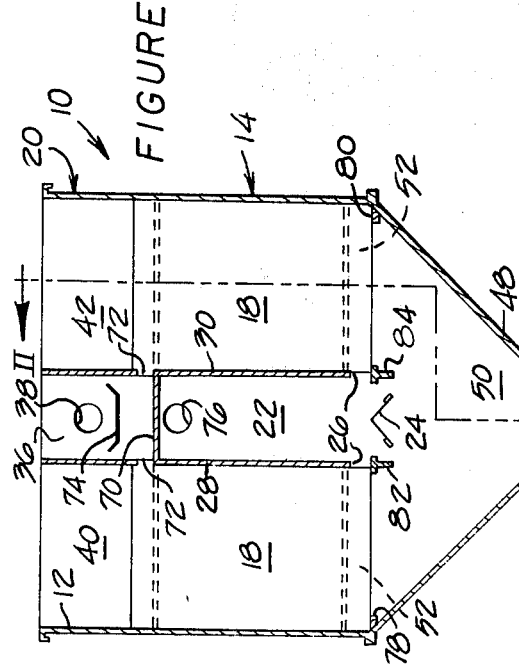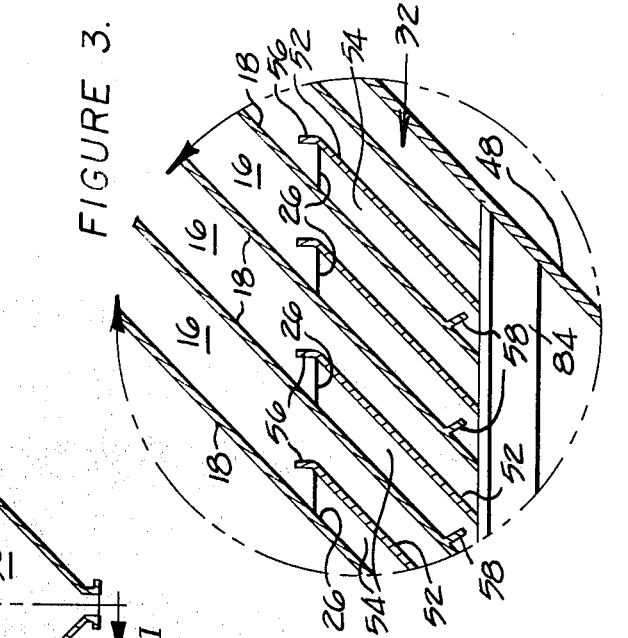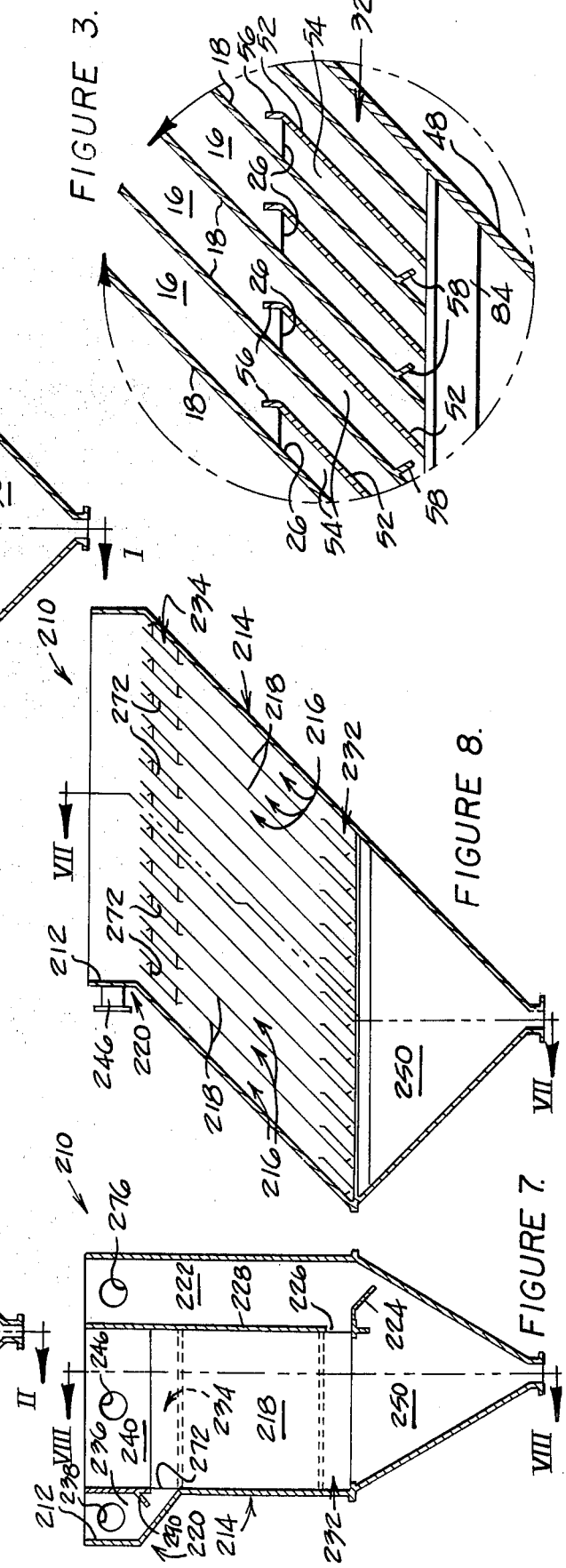

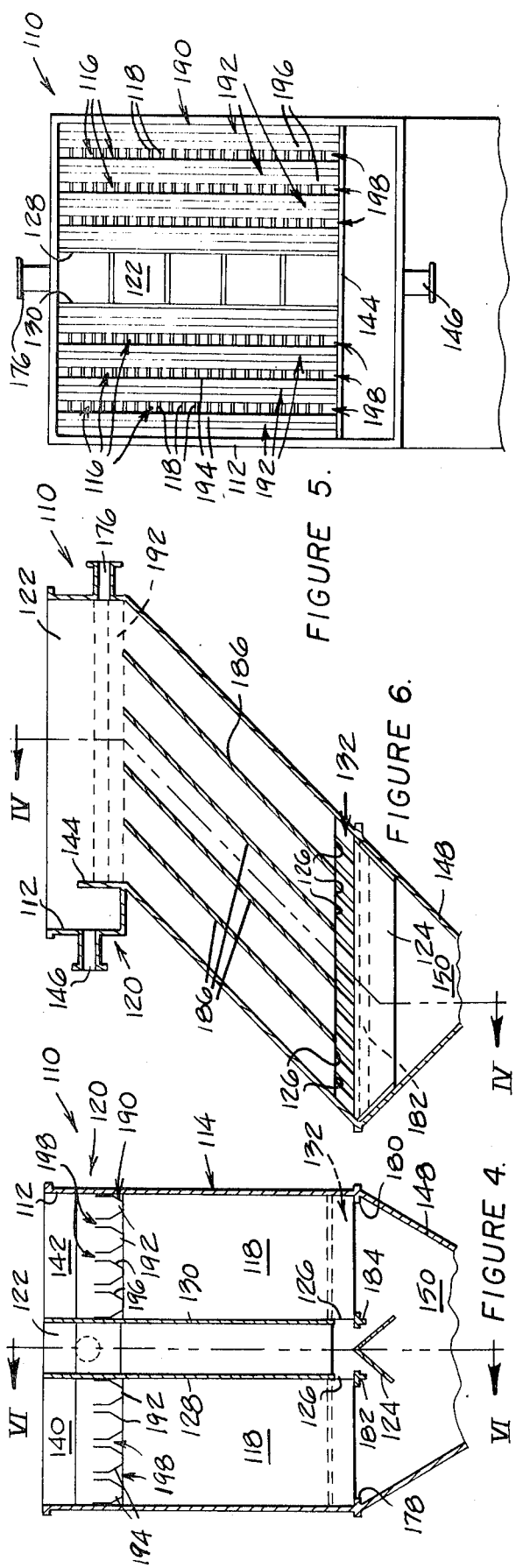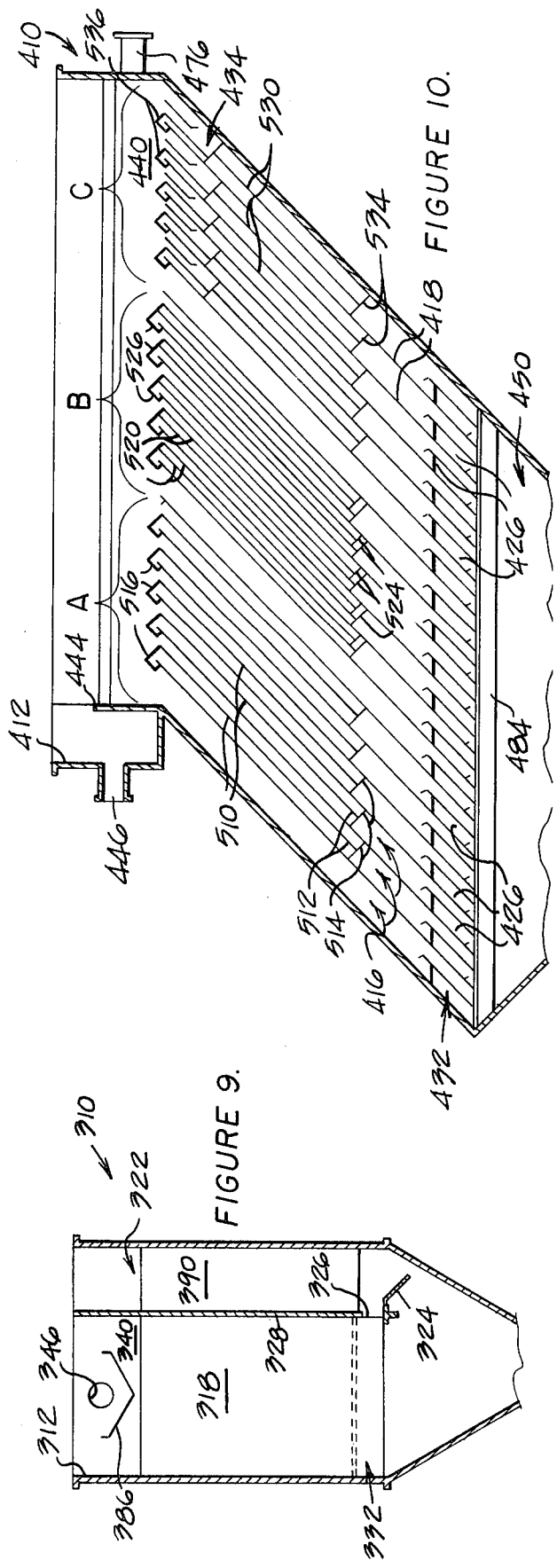

VERTICAL FLOW INCLINED PLATE CLARIFIER

BACKGROUND OF THE INVENTION

The present invention relates to clarifiers of a type wherein inclined flow passages are formed by a plurality of parallel, spaced apart plates and more particularly to such clarifiers wherein liquid to be clarified flows generally vertically through the inclined flow passages.

Various types of clarifiers have been developed for use in place of large settling basins, tanks or the like where liquid is held over prolonged periods of time until clarification occurs because of normal sedimentation and phase separation phenomena. Inclined plate clarifiers have been found to be particularly effective in such applications, particularly in industrial and municipal water treatment facilities, because of increasingly rigid requirements for high effluent quality.

Inclined plate clarifiers are commonly characterized by a number of inclined flow passages formed by parallel, spaced apart plates. The concept of employing a series of inclined passages in close proximity to each other has been found to be particularly effective since the settling area per unit volume is greatly increased while, at the same time, the overall size and cost for the clarifier or settling unit may be reduced.

Within an inclined plate clarifier, liquid to be clarified flows along the flow passages between the plates and is subject to phase separation or the settling of solids under conventional principles of operation. Inclined plate clarifiers may generally be divided into classes adapted respectively for generally vertical flow or for cross-flow where liquid to be clarified flow generally horizontally through the flow passages. Vertical flow clarifiers may be adapted for operation either in an "upflow" and/or "downflow" mode of operation with relatively heavy and/or light phase material being removed as the liquid flows along the inclined passages.

The present invention particularly contemplates a vertical flow clarifier in which liquid to be clarified flows generally vertically through the inclined flow passages formed by the spaced apart plates. Thus, inlet and outlet means for the clarifier are in communication with the flow passages generally adjacent their inclined ends.

It is often a particular problem to uniformly distribute influent liquid across each of the flow passages in vertical flow clarifiers. Without such uniform distribution, excessive settling may tend to occur within portions of the flow passages and may even result in settled solids tending to block or plug the flow passages. A related problem involves solids which initially settle while the liquid is being introduced into the flow passages. Buildup of these initially settled solids may also tend to cause undesirable blockage. Accordingly, it is particularly important to assure that any such initially settled solids may pass into a suitable sediment chamber and are not allowed to remain in the flow passages.

It is also particularly desirable to adapt such clarifiers for operation under widely varying conditions. For example, in some applications, liquids to be clarified may have varying amounts of suspended solids ranging from heavy material tending to settle out very rapidly to light material which is difficult to separate and may in some instances require the use of flocculating agents. Liquids to be clarified may also require the removal of a relatively low density phase such as oils suspended in water. The liquid may also be either aqueous or non-aqueous and, in some instances, may include both solids subject to settling under the effects of gravity as well as one or more low density phases which must be separated in order to produce a clarified liquid of satisfactory quality.

In summary, various clarifiers in the prior art have demonstrated an ability to operate satisfactorily in selected applications. However, a need has been found to remain for a vertical flow clarifier which is adaptable to a variety of operating conditions and which may be employed to produce a high quality effluent.

SUMMARY OF THE INVENTION

Accordingly, it is an object of the present invention to provide a vertical flow inclined plate clarifier adapted to overcome one or more problems of the type discussed above.

More specifically, it is an object of the invention to provide a vertical flow clarifier including flow regulating channel means for effectively regulating liquid communication at the inclined ends of the flow passages. In particular, such a flow regulating channel means is contemplated for introducing liquid to be clarified adjacent one end of each inclined flow passage and to uniformly distribute the liquid throughout the respective passage.

At the same time, it is a related object of the invention to provide similar flow regulating channel means effective to direct separated phase material toward an appropriate portion of the clarifier. For example, with relatively heavy suspended solids being removed from a liquid passing upwardly through the flow passages, the flow regulating channel means arranged adjacent the lower ends of the inclined flow passages uniformly distribute liquid to be clarified throughout the flow passages for travel in an upward direction while assuring that initially settled solids pass directly to a suitable sediment chamber.

It is even further contemplated that the flow regulating channel means are provided at either the lower or upper ends of the inclined flow passages depending upon whether the clarifier is contemplated for upflow or downflow operation. In addition, similar flow regulating channel means may be employed at both inclined ends of the flow passages under certain conditions which will be made more apparent in the following description.

It is also an object of the invention to provide a separate influent chamber within an inclined plate clarifier, the influent chamber being in communication with a suitable sediment chamber so that solids settling within the influent chamber may directly pass into the sediment chamber without fouling or overloading passages communicating the influent chamber with the flow passages.

It is yet another related object of the invention to provide a separate influent chamber which is formed with inclined spaced apart plates to facilitate initial settling of solids within the influent chamber. Solids which settle within the influent chamber may then pass directly to the sediment collection chamber as noted above.

It is yet another object of the invention to provide a vertical flow clarifier wherein inclined flow passages are formed by parallel, spaced apart clarifier plates, the clarifier further being adapted for the selected installation of inclined slave plates between relatively fixed clarifier plates in order to provide an increased number of flow channels having an effectively reduced width or settling dimension.

An even further object of the invention is to provide a unique interface arrangement at the upper ends of the inclined flow passages for an upflow clarifier, the interface comprising a plurality of interface plates having surfaces which incline upwardly and toward each other to form restricted passages for regulating the flow of liquid toward the upper ends of the flow passages, the inclined surfaces tending to facilitate the upward passage of relatively low density material so that it may properly escape from the clarifier.

Additional objects and advantages of the present invention are made apparent in the following description having reference to the accompanying drawings.

BRIEF DESCRIPTION OF THE DRAWINGS

FIG. 1 is an end view, with parts in section, of an inclined plate clarifier constructed in accordance with the present invention.

FIG. 2 is a view taken along section line II—II of FIG. 1.

FIG. 3 is an enlarged fragmentary view of a portion of the clarifier of FIG. 2 to more clearly illustrate the flow regulating channel assembly construction at the inclined ends of the flow passages within the clarifier.

FIG. 4 is an end view, with parts in section, of another embodiment of an inclined plate clarifier constructed in accordance with the present invention.

FIG. 5 is a plan view of the inclined plate clarifier of FIG. 4.

FIG. 6 ia a view taken along section line VI—VI of FIG. 4.

FIG. 7 is an end view, with parts in section, of another embodiment of an inclined plate clarifier constructed in accordance with the present invention.

FIG. 8 is a view of the inclined plate clarifier taken along section line VIII—VIII of FIG. 7.

FIG. 9 is also an end view, with parts in section, of still another embodiment of an inclined plate clarifier constructed in accordance with the present invention.

FIG. 10 is a centrally sectioned side view of an inclined plate clarifier generally similar to the clarifier of FIG. 4 while illustrating three different variations of slave plates selectively inserted between the standard parallel, spaced apart clarifier plates in order to adjust the number and size of flow passages within the clarifier.

DESCRIPTION OF THE PREFERRED EMBODIMENTS

As was indicated above, the present invention relates to a clarifier of the type represented by the various embodiments in FIGS. 1-10, each including a number of inclined flow passages formed by parallel, spaced apart plates and characterized by features particularly contemplated to adapt the clarifier for use under various conditions while enhancing the rate and/or quality of clarification.

The present clarifier is particularly adapted for vertical flow operation. As will be made more apparent in the following description, certain of the clarifiers described below may be operated in either or both an upflow and downflow mode of operation. In this connection, the term "upflow" indicates that the major direction of flow of liquid to be clarified within the clarifier takes place in an upward direction at least through the inclined flow passages formed by the parallel spaced apart plates. Similarly, the term "downflow" indicates that the major direction of flow for liquid to be clarified takes place in a downward direction at least through the inclined flow passages.

The various novel features of the clarifier of the present invention are each illustrated in one or more of FIGS. 1-10. These novel features are summarized immediately below prior to a more detailed description of the drawings.

The clarifier of FIGS. 1 and 2 includes a novel flow regulating channel assembly for regulating flow in each of a plurality of inclined flow passages. Such a flow regulating channel means may be employed to distribute effluent into each of the inclined flow passages at either the lower or upper ends of the passages depending upon whether the clarifier is contemplated for upflow or downflow operation respectively.

Within the embodiment of FIGS. 1 and 2, flow regulating channel means are employed at both the lower and upper ends of each inclined flow passage. With the clarifier being adapted for operation in an upflow mode, the flow regulating channel means at the lower ends of the flow passages serve to introduce influent to the flow passages while the flow regulating channel means at the upper ends of the inclined flow passages serve to remove clarified effluent from the flow passages and direct it toward a suitable outlet.

It will be apparent from the detailed description of the embodiment of FIGS. 1 and 2, as set forth below, that the clarifier may also be operated in a downflow mode with the flow regulating channel means at the upper ends of the flow passages serving to distribute influent throughout the flow passages with or without similar flow regulating channel means at the lower ends of the flow passages serving to remove clarifier effluent. The flow regulating channel means at the ends of the inclined flow passages are illustrated in greater detail within FIG. 3.

The clarifier of FIG. 1 also includes a separate region which serves an an influent chamber with the clarifier being operated in an upflow mode. The influent chamber is particularly contemplated for use where liquid to be clarified contains solids which tend to settle out rapidly. As may be best seen in FIG. 1, the bottom of the influent chamber is in communication with a sediment chamber in a lower portion of the clarifier.

Communication between the influent chamber and the sediment chamber is limited so that liquid from the influent chamber tends to flow into the inclined flow passages with only settled solids tending to pass into the sediment chamber.

A modification of the influent chamber is illustrated in FIG. 4 with an inverted V-shaped plate regulating communication between the influent chamber and the sediment collection chamber. The legs of the V-shaped plate extend downwardly into the sediment collection chamber substantially below the lower ends of the inclined plates in order to reduce the likelihood of settled solids being carried upwardly into the inclined flow passages between the plates.

The clarifier of FIGS. 4-6 also illustrates the use of additional spaced apart parallel plates within the influent chamber in order to improve flow distribution and to increase the initial settling of solids therein prior to passage of the influent into the inclined flow passages between the clarifier plates. In this manner, a substantial portion of suspended solids may pass directly into the sediment chamber and thus reduce the likelihood of the flow passages becoming plugged or impeded.

The clarifier of FIGS. 4-6 also includes an interface arrangement of V-shaped troughs above the upper ends of the inclined plates in order to better regulate flow within the clarifier, particularly when it is being operated in an upflow mode.

The clarifier of FIGS. 7 and 8 is modified to the extent that a single assembly of inclined clarifier plates is employed with a similar influent chamber being formed along one side wall of the clarifier housing. Otherwise, the influent chamber is similarly in direct communication with a sediment collection chamber, flow regulating channel means being employed to distribute liquid from the influent chamber throughout the lower ends of the inclined flow passages. Similar flow regulating channel means are also employed at the upper ends of the inclined flow passages to receive effluent.

FIG. 9 illustrates yet another embodiment of a clarifier which is similar to that of FIGS. 7 and 8 except that flow regulating channel means are not employed at the upper ends of the inclined flow passages. Rather, the upper ends of the flow passages are open with effluent being received in a separation chamber formed above the inclined clarifier plates.

As was indicated above, the clarifier of FIG. 10 is generally similar to the clarifier of FIGS. 4-6. The clarifier of FIG. 10 illustrates three different variations of slave plates which may be selectively inserted between the fixed inclined clarifier plates in order to adjust the number and size of inclined flow passages within the clarifier depending upon the particular operating conditions being encountered.

A more detailed description of the various embodiments illustrated in FIGS. 1-10 is set forth below.

The Embodiment of FIGS. 1-3

Referring now to the drawings and particularly to FIGS. 1 and 2, a vertical flow, inclined plate clarifier of the type contemplated by the present invention is generally indicated at 10. The clarifier 10 includes a housing 12 having a separation section 14 of trapezoidal shape in cross-section, wherein a plurality of inclined flow passages 16 are formed by clarifier plates 18 mounted in parallel spaced apart relation within the housing. An upper section 20 of the clarifier housing includes outlet means through which clarifier effluent and relatively low density material may exit the clarifier.

Referring particularly to FIG. 1, the clarifier housing also forms a centrally arranged influent chamber 22 through which influent is introduced into the clarifier, particularly when the clarifier 10 is operated in an upflow mode. The bottom of the influent chamber 22 is open so that settled solids may pass directly out of the influent chamber. The bottom of the influent chamber is partially closed by an inverted V-shaped flow limiting plate 24 which allows settled solids to pass from the bottom of the influent chamber 22 while liquid from the influent chamber 22 tends to be directed into the lower ends of the inclined flow passages 16 through openings 26 formed by side walls 28 and 30 of the housing.

The clarifier 10 also includes flow regulating channel means 32 at the lower end of each of the inclined flow passages 16 for receiving influent from the openings 26 and uniformly distributing the influent throughout the respective flow passages. In addition, the flow regulating channel means 32 serve to communicate any solids settled therein directly to a sediment chamber in a lower portion of the clarifier as described in greater detail below.

Similar flow regulating channel means 34 are also provided at the upper ends of the inclined flow passages 16 for two reasons within the embodiment of FIGS. 1 and 2. Initially, with the clarifier operating in an upflow mode, the flow regulating channel means 34 serve to collect clarified effluent and direct it to a central collection reservoir 36 which is in communication with an effluent conduit 38. Low density material such as oil or the like may rise into separation chambers 40 and 42 formed on opposite sides of the reservoir 36 within the upper housing section 20. Low density material from the separation chambers 40 and 42 may pass over a weir 44 and out of the clarifier through a conduit 46. The height of the weir 44 must be maintained in carefully selected relation to the effluent conduit 38 to assure proper operation of the clarifier. The construction and operation of these portions of the clarifier are described in greater detail below.

The clarifier housing 12 also includes a tapered portion 48 forming a sediment chamber 50 beneath the inclined clarifier plates 18 and the influent chamber 22. The tapered housing portion 48 may be formed as an integral portion of the entire clarifier housing 12 or as a separate structure which may be combined with the rest of the clarifier 10 during installation. The sediment chamber may also be formed by a floor or supporting structure upon which the clarifier 10 is mounted. In any event, the sediment chamber 50 is equipped with means (not shown) for periodically or continuously removing sediment which collects in the chamber 50 during operation of the clarifier.

Referring also to FIG. 3, each of the flow regulating channel means 32 at the lower ends of the inclined flow passages 16 is formed basically by an elongated plate 52 which is spaced apart from the lower surface of an adjacent clarifier plate 18 to form an enclosed region 54 extending across the length of each of the inclined flow passages 16. An upper edge 56 of each of the elongated plates 52 is bent inwardly toward the adjacent inclined clarifier plate 18 in order to form a flow restriction for liquid passing out of the enclosed region 54. Similarly, a lip 58 extends downwardly from the respective inclined clarifier plate 18 to form another flow restriction for limiting liquid flow downwardly from the enclosed region 54. In this manner, liquid entering each of the enclosed regions 54 through one of the openings 26 tends to be distributed along the length of the enclosed region for even passage into the respective inclined flow passages.

The relative flow restrictions formed by the upper edge 56 and the lip 58 are sized so that flow caused within the clarifier by a hydrostatic or hydrodynamic head tends to pass upwardly from the enclosed region 54 through the respective inclined flow passages 16 rather than downwardly toward the sediment chamber 50. The opening formed between the lip 58 and the elongated plate 52 allows solids which settle within the enclosed region 54 to pass directly into the sediment collection chamber 50. Thus, the flow regulating channel means 32 serve to distribute influent uniformly throughout the inclined flow passages 16 while allowing any initially settled solids to pass directly into the sediment collection chamber 50.

The flow regulating channel means 34 arranged at the upper ends of the inclined flow passages 16 are of similar construction except that the components of the flow regulating channel means 34 are rotated 180° relative to the components of the flow regulating channel means 32. Accordingly, each of the upper flow regulating channel means 34 is similarly formed from an elongated plate indicated at 62 to define an enclosed region 64 and having a similar bent lower edge 66 with a lip 68 extending upwardly from the upper surface of the adjacent inclined clarifier plate 18.

Referring particularly to FIG. 1, it may be seen that the two side walls 28 and 30 for the influent chamber 22 extend upwardly through the upper housing portion 20 to form the effluent reservoir 36. The influent chamber 22 and the effluent reservoir 36 are separated by a plate 70. Above the plate 70, the sidewalls 28 and 30 form openings 72 which communicate the respective enclosed regions 64 with the effluent reservoir 36. As will be more apparent from the following operational description for the clarifier 10, clarified effluent tends to be collected within the reservoir 36 while low density material is collected within the separation chambers 40 and 42. A baffle 74 extends along the length of the effluent reservoir 36 in order to assist in maintaining more uniform flow through the openings 72.

In operation of the clarifier 10 in an upflow mode, liquid to be clarified is introduced into the influent chamber 22 through an inlet conduit 76. The influent tends to flow downwardly through the chamber 22. Solids which settle from the influent within the inlet chamber 22 pass directly into the sediment chamber 50 past the V-shaped plate 24. It may be seen in FIG. 1 that the inclined clarifier plates 18 are supported by side beams 78 and 80 as well as spaced apart center beams 82 and 84 which are arranged adjacent the inverted V-shaped plate 24. The downwardly depending legs of the V-shaped plate 24 may be adjusted to vary the openings formed with the respective beams 82 and 84 depending upon the amount of solids tending to settle within the influent chamber 22. Preferably, the openings at the bottom of the influent chamber permit any settled solids to pass directly into the sediment collection chamber 50 while the influent liquid flows predominantly through the openings 26.

The influent flowing through the openings 26 enters the respective enclosed regions 54 and passes upwardly through the respective inclined flow passages 16 as described above. Any additional solids which tend to settle out within the enclosed region 54 pass downwardly and directly enter the sediment chamber 50. Thus, a substantial portion of solids within the influent may be communicated into the sediment chamber 50 even before the influent enters the respective inclined flow passages 16. This serves to reduce the amount of settling required within the flow passages and produces a better quality effluent while also tending to prevent the possibility of solids becoming plugged within any portion of the inclined flow passages.

As liquid from the enclosed regions 54 of the flow regulating channel means 32 passes upwardly through the respective inclined flow passages 16, solids tend to settle out on the upper inclined surfaces of the plates 18 and to slide downwardly toward the sediment chamber 50 under the influence of gravity.

At the same time, any relatively low density material such as oil, tends to collect upon a lower inclined surface of each of the clarifier plates 18. This low density material tends to pass upwardly out of the open upper ends of the inclined flow passages 16 into the separation chambers 40 and 42. The low density material from the separation chambers may then pass over the weir 44 and out of the clarifier through the conduit 46.

At the same time, clarified effluent approaching the upper ends of the respective inclined flow passages 16 tends to enter the enclosed regions 64 of the respective flow regulating channel means 34 and to pass through the openings 72 into the effluent reservoir 36. The effluent may of course exit the reservoir 36 through the outlet conduit 38. Any low density material tending to separate from the effluent within the upper enclosed region 64 may pass upwardly through the restricted openings formed between the plates 62 and the lips 68. Thus, the upper flow regulating channel means 34 serve to collect clarified effluent and direct it to the reservoir 36. At the same time, the restricted openings along the upper edges of their enclosed regions 64 permit any separated low density materials therein to pass into the separation chambers 40 and 42. In addition, these openings serve to prevent the upper flow regulating channel means 34 from becoming air-locked.

Before proceeding to a description of the other embodiments, it is also noted that the clarifier 10 of FIGS. 1–3 may be operated in reverse with liquid to be clarified entering through the conduit 38 and being directed through the openings 72 into the flow regulating channel means 34. In this event, the flow regulating channel means 34 serve a similar function as described above for the flow regulating channel means 32 in that they uniformly distribute the influent throughout the respective inclined flow passages 16. Thereafter, the influent liquid passes downwardly through the passages 16 with the solids again entering the sediment collection chamber 50. Clarified effluent is collected by the flow regulating channel means 32 and directed through the openings 26 and chamber 22 for exit from the clarifier through the conduit 76. Low density material such as oil would again tend to be collected within the separation chambers 40 and 42 for removal from the clarifier in the same manner described above.

The Embodiment of FIGS. 4–6

Another emobidment of a clarifier according to the present invention is indicated at 110 in FIGS. 4–6. Many components of the clarifier 110 are similar to those described above for the clarifier 10 of FIGS. 1 and 2. Accordingly, similar components in the clarifier 110 are identified by the same numerical labels as for the clarifier 10 while being preceded by the numeral "1". Accordingly, the housing 112 for the clarifier 110 is similar to the housing 12 for the clarifier 10. A number of modifications and additional features are included within the clarifier 110.

Initially, the influent chamber 122 is open at the top since the clarifier 110 does not include an effluent reservoir similar to that indicated at 36 in FIG. 1. Similarly, there are no flow regulating channel means at the upper ends of the flow passages such as those indicated at 34 in FIG. 1. Rather, effluent from the clarifier 110 collects within the separation chambers 140 and 142. Effluent in the separation chambers 140 and 142 passes over the weir 144 and exits the clarifier through the effluent outlet conduit 146.

An additional feature is provided within the influent chamber 122 for facilitating rapid separation of solids. As may be best seen in FIG. 6, a plurality of relatively widely spaced inclined plates 186 are arranged within the influent chamber 122 and act in generally conventional fashion to promote flow distribution and the separation of solids within the influent chamber. Thus, a greater percentage of solids is removed within the influent chamber so that a higher quality effluent may be produced within the inclined flow passages 116.

Referring particularly to FIG. 4, the inverted V-shaped plate 124 which limits communication from the influent chamber 122 into the sediment collection chamber 150 extends substantially downwardly into the sediment collection chamber. Solids sliding down the upper surfaces of the plate 124 are thus carried lower into the sediment collection chamber 150 before falling freely from the edges of the inclined V-shaped plate. Thus, there is less likelihood of the solids being carried upwardly into the inclined flow passages 116.

Influent from the chamber 122 passes through the openings 126 and is distributed throughout the inclined flow passages 116 by the flow regulating channel means 132 which operate in the same manner as described above for the flow regulating channel means 32 of FIGS. 1 and 2. Uniform flow within the flow passages 116 is further promoted by an interface assembly 190 comprising a plurality of V-shaped troughs 192. Each trough is formed with a pair of inclined surfaces 194 and 196. The V-shaped troughs 192 are spaced apart in order to form openings 198 which extend transversely throughout the clarifier relative to the inclined flow passages 116. The inclined surfaces of the troughs 192 prevent the interface assembly from trapping any material while the openings 198 regulate the flow of effluent from the inclined flow passages 116 into the chambers 140 and 142. Thus, the interface assembly serves to promote more uniform flow of liquid upwardly through the inclined flow passages 116.

Otherwise, the clarifier of FIGS. 4-6 operates in generally the same manner as was described above for the clarifier 10 of FIGS. 1-3.

The Embodiment of FIGS. 7 and 8

Yet another clarifier constructed in accordance with the present invention is indicated at 210 in FIGS. 7 and 8. The clarifier 210 includes generally the same features and operates in essentially the same manner as the clarifier 10 of FIGS. 1-3. However, the clarifier 210 includes only a single array of inclined clarifier plates with an influent chamber being formed along one lateral side of the clarifier housing.

Referring particularly to FIG. 7, the clarifier 210 includes a housing 212 forming a separation section 214. Inclined flow passages 216 are formed by parallel, spaced apart clarifier plates 218.

An upper housing section 220 forms separate means for receiving effluent and low density material from the clarifier. An influent chamber 222 is formed along one lateral side of the clarifier housing 212 with a side wall 228 for the influent chamber forming openings 226 for communicating influent from the chamber 222 into the flow regulating channel means 232 corresponding to those indicated at 32 in FIGS. 1 and 2.

An adjustable plate 224 is mounted at the open lower end of the influent chamber 222 in order to regulate the passage of settled solids from the influent chamber 222 into the sediment chamber 250 in the same manner described above for the flow limiting plate 24 of FIGS. 1 and 2.

The flow regulating channel means 232 serve substantially the same purpose as the flow regulating channel means 32 of FIGS. 1 and 2. Normal separation takes place as liquid flows upwardly through the inclined flow passages 216. Flow regulating channel means 234 are arranged at the upper ends of the inclined flow passages 216 and conform with the flow regulating channel means 34 of FIGS. 1 and 2. Clarifier effluent received by the flow regulating channel means 234 is communicated through openings 272 into an effluent reservoir 236 from which it exits the clarifier through an outlet conduit 238. Flow from the upper flow regulating channel means 234 may be further adjusted by a baffle 290 mounted at the bottom of the effluent reservoir. The baffle 290 may be adjusted in order to regulate the rate of effluent flow through the openings 272. Low density material being separated within the inclined flow passages 216 collects within a separation chamber 240 from where it may exit the clarifier by means of an outlet conduit 246.

Influent liquid is introduced into the clarifier 210 through an inlet conduit 276. Thereafter, the various components of the clarifier 210 operate in substantially the same fashion described above for the clarifier 10 of FIGS. 1 and 2. The clarifier 210 is also preferably adapted for operation in an upflow mode. However, it is also possible to operate the clarifier 210 in a downflow mode with influent being introduced through the conduit 238. In such a mode of operation, the baffle 290 may be removed or may be adjusted in order to regulate the flow of influent into the clarifier.

The Embodiment of FIG. 9

Yet another clarifier constructed in accordance with the present invention is indicated at 310 in FIG. 9. The overall configuration of the clarifier 310 is similar to that of the clarifier 210 in FIGS. 7 and 8. However, like the clarifier 110 of FIGS. 4 and 6, the clarifier 310 does not employ flow regulating channel means at the upper ends of the inclined flow passages corresponding to those indicated at 34 in FIGS. 1 and 2. Accordingly, the clarifier 310 does not employ an effluent reservoir such as indicated at 236 in FIG. 7. Rather, effluent from the inclined flow passages enters the separation chamber 340 above the inclined clarifier plates and flows over a weir 386 to exit the clarifier through the outlet conduit 346.

The clarifier 310 is also provided with supplemental inclined plates, one of which is indicated at 390 in FIG. 9. Inclined plates such as those indicated at 390 in FIG. 9 could also be employed within the influent chamber 222 for the clarifier 210 of FIGS. 7 and 8.

Otherwise, the clarifier 310 of FIG. 9 operates in substantially the same manner as described above for the preceding clarifiers.

The Embodiment of FIG. 10

Referring now to FIG. 10, yet another embodiment of a clarifier constructed in accordance with the present invention is indicated at 410. The clarifier 410 of FIG. 10 is of substantially the same construction as the clarifier 110 in FIGS. 4-6. However, the clarifier 410 does not include an interface assembly such as that indicated at 190 in FIGS. 4-6. Otherwise, basic components of the clarifier 410 are labeled similarly as for the clarifier 110 except that the labels are preceded by the number 4 instead of the number 1.

The clarifier 410 of FIG. 10 is adapted to selectively receive inclined slave plates which are designed to vary the number and dimension of inclined flow passages within the clarifier. Three different arrangements of slave plates are illustrated at A, B and C. Note that in sections A and B of the clarifier 410, no flow regulating channel means are provided at the upper ends of the flow passages. Within the clarifier section C, flow regulating channel means are provided as indicated at 434 and are constructed and operated in substantially the same manner as the flow regulating channel means 34 of FIGS. 1 and 2.

The slave plate arrangements in the various clarifier sections A, B and C are described below.

Referring initially to the clarifier section A, the single clarifier plates 510 are arranged between each adjacent set of inclined clarifier plates 418. The slave plates 510 are of about the same width as the clarifier plates 418 in order to extend completely across the flow passages 416. The upper ends of the slave plates terminate at approximately the same level as the upper ends of the inclined clarifier plates 418. However, the lower ends 512 of the slave plates 510 terminate substantially above the flow regulating channel means 432. This spacing is necessary since, as suspended solids settle on the upper surfaces of the slave plates 512, the solids slide downwardly and at the lower ends of the slave plates 512 must pass to the upper surface of the respective clarifier plates 418. Thus, the abovenoted spacing is necessary so that the solids from the slave plates 512 may drop to the clarifier plates 418 without being disrupted by the upward flow of liquid from the flow regulating channel means 432.

The slave plates 512 are intended to generally divide the flow passages 416 evenly and are accordingly supported by spacers indicated at 514 adjacent the lower ends of the slave plates. Similar spacer means could be employed at the upper ends of the slave plates as well. However, the upper ends of the slave plates are preferably supported by hangers 516 which secure the upper end of each slave plate 512 to an adjacent clarifier plate 418. In this manner, the hangers 516 serve to locate the slave plate vertically within the flow passages 416 as well as maintaining their spacing relative to the adjacent clarifier plates 418.

Referring now to section B of the clarifier 410, similar slave plates 520 are arranged within the flow passages 416 except that two of the slave plates 520 are arranged in evenly spaced apart relation within each of the flow passages 416. Otherwise, the slave plates 520 include generally similar spacer means 524 and hanger means 526 for maintaining their position between the clarifier plates 418.

In section C of the clarifier 410, similar slave plates 530 are arranged individually within each of the inclined flow passages 416. However, with the flow regulating channel means 434 being employed at the upper ends of the flow passages 416, the slave plates 530 are terminated substantially therebelow. The end spacing between the slave plates 530 and the flow regulating channel means 434 is for the same purpose described above in connection with the spacing between the lower ends of the slave plates 512 and the flow regulating channel means 432. Accordingly, the slave plates 530 include spacer means 534 arranged at both their upper and lower ends. Hanger means 536 similarly engage the upper ends of the adjacent clarifier plates 418 and extend downwardly through the inclined flow passages for engagement with the slave plates 530.

Various embodiments of upflow and downflow clarifiers have thus been described above in accordance with the present invention. It will be obvious that numerous additional modifications and variations are possible within the scope of the present invention. Accordingly, the scope of the present invention is defined only by the following appended claims.

What is claimed is:

1. In a clarifier having inclined flow passages formed by a plurality of spaced apart, inclined parallel plates mounted within a housing, the clarifier being adapted for upflow operation with the housing forming a sediment chamber below the inclined plate and means at the upper end of the plates for receiving effluent, the improvement comprising a flow regulating channel assembly for regulating flow of influent into the respective flow passages from a separate influent chamber formed by the housing, a portion of the housing forming openings adjacent the lower ends of the inclined plates for respectively communicating the influent chamber with each inclined flow passage, each flow regulating channel assembly including an elongated plate spaced apart from the lower inclined surface of each clarifier plate adjacent its lower inclined end, the elongated plate forming an enclosed region together with the lower inclined surface of the spaced apart clarifier plate, the enclosed region being in comminication with the influent chamber through one of said openings, upper and lower flow restricting passage means being arranged above and below the elongated plate and extending substantially along the length of the elongated plate to limit flow from the upper and lower ends respectively of the enclosed region while communicating the enclosed region with both the respective flow passage and sediment chamber, the amount of flow limitation produced by the upper and lower flow restrictions being selected so that influent liquid entering the enclosed region from the separate influent chamber tends to be distributed uniformly across the respective flow passage and to flow upwardly from the enclosed region while suspended solids settling out of the influent liquid within the enclosed region tend to pass downwardly through the lower flow restriction toward the sediment chamber.

2. The clarifier of claim 1 further comprising a similar flow regulating channel assembly formed adjacent an upper inclined surface at the upper inclined end of the respective clarifier plates, effluent collection means being formed by an upper portion of the clarifier housing in communication with said additional flow regulating channel assemblies, a separation chamber also being formed above the upper inclined ends of the flow passages to receive relatively low density material tending to separate within the inclined flow passages.

3. The clarifier of claim 1 wherein a lower end portion of the influent chamber is in limited communication with the sediment chamber to allow solids settling within the influent chamber to pass directly to the sediment chamber.

4. The clarifier of claim 3 further comprising additional inclined, spaced apart plates arranged within the influent chamber to promote settling of the suspended solids therein.

5. In a clarifier having inclined flow passages formed by spaced apart, parallel plates mounted within a housing, the clarifier being adapted for downflow operation with the housing forming a collection chamber above the inclined plates to receive relatively low density phase material and means formed toward the lower ends of the inclined flow passages for receiving an effluent, the improvement comprising

- a flow regulating channel assembly for regulating flow of influent into the respective flow passages from a separate influent chamber formed by the housing,
- a portion of the housing forming openings adjacent the upper inclined ends of the inclined plates for respectively communicating the influent chamber with each inclined flow passage,
- each flow regulating channel assembly including
- an elongated plate spaced apart from the upper inclined surface of each inclined plate adjacent its upper inclined end, the elongated plate forming an enclosed region together with the upper inclined surface of the spaced apart inclined plate, the enclosed region being in communication with the influent chamber through one of said openings,
- flow restricting passage means being arranged above and below the elongated plate to limit flow from the upper and lower ends respectively of the enclosed region while communicating the enclosed region substantially along its length with both the respective flow passage and collection chamber, the amount of flow limitation produced by the upper and lower flow restrictions being selected so that influent liquid entering the enclosed region from the separate influent chamber tends to be distributed uniformly across the respective flow passage and to flow downwardly from the enclosed region through the respective flow passage toward the effluent receiving means.

6. The clarifier of claim 5 wherein the flow restricting passage means arranged along an upper edge of each elongated plate is sized to permit low density material tending to separate within the enclosed region to pass directly upwardly into the collection chamber formed above the inclined flow passages.

7. In a clarifier having inclined flow passages formed by a plurality of spaced apart and inclined parallel plates mounted within a housing, the clarifier being adapted for upflow operation with the housing forming a sediment chamber below the inclined plates and collection means at the upper end of the plates for receiving effluent, the improvement comprising

- a separate influent chamber formed by the housing,
- a portion of the housing forming openings adjacent the lower ends of the inclined plates,
- a plurality of flow regulating channel assemblies for regulating flow of influent into the lower inclined ends of the respective flow passages, the openings formed by the housing being in respective communication with the flow regulating channel assemblies, the flow regulating channel assemblies including flow restricting passage means for distributing influent from the influent chamber uniformly across the respective flow passages, and
- flow regulating passage means providing limited communication from a lower portion of the influent chamber into the sediment chamber, the flow regulating passage means being selected to permit settled solids at the bottom of the influent chamber to pass directly into the sediment chamber while influent liquid tends to flow through the openings into the inclined flow passages.

8. The clarifier of claim 7 wherein each of the flow regulating channel assemblies includes additional flow restricting passage means for allowing initially settled solids to pass directly into the sediment chamber.

9. The clarifier of claim 7 further comprising a plurality of spaced apart inclined parallel plates arranged within the influent chamber.

10. The clarifier of claim 7 further comprising an inlet for introducing influent liquid into the influent chamber, the inlet being arranged adjacent the upper inclined ends of the parallel plates in the influent chamber.

11. The clarifier of claim 7 further comprising interface means arranged above said inclined plates to form elongated transverse openings above the inclined plates for restricting communication between said inclined flow passages and said collection chamber.

12. The clarifier of claim 11 wherein said interface means comprises a plurality of inclined interface plates extending transversely above said inclined clarifier plates, adjacent and oppositely inclined interface plates forming restricting transverse passages above said inclined flow passages.

13. In a clarifier having inclined flow passages formed by a plurality of spaced apart, parallel plates mounted within a housing, the clarifier being adapted for generally vertical flow operation and comprising flow regulating channel means arranged generally adjacent one inclined end of the respective inclined flow passages for uniformly distributing influent liquid across the respective flow passage to flow toward the other inclined end thereof,

- means being arranged adjacent the other inclined ends of the flow passages to receive liquid from the respective flow passages,
- the housing forming a separate influent chamber with openings for communicating the influent chamber with the respective flow regulating channel means,
- a plurality of inclined, spaced apart plates being arranged within the influent chamber to assist in the settling of solids from liquid therein, and
- a sediment chamber arranged to receive settled solids from the influent chamber and the inclined flow passages,
- a lower portion of the influent chamber being in direct communication with the sediment chamber and having flow limiting means for regulating flow between the influent chamber and the sediment chamber.

14. The clarifier of claim 12 wherein the influent chamber includes an inlet conduit for admitting influent to the influent chamber, the influent conduit being located adjacent the inclined ends of the spaced apart plates within the influent chamber opposite from the openings for communicating the influent chamber with the respective flow regulating channel means.

15. A vertical flow clarifier comprising

- a housing,
- inclined plates forming a plurality of inclined flow passages within the housing,
- inlet and outlet means arranged adjacent opposite inclined ends of the flow passages for causing liquid to be clarified to flow vertically along the inclined passages,
- a sediment chamber arranged below the flow passages for receiving settled solids,
- a separation chamber formed above the inclined flow passages for receiving a relatively low density phase material, a plurality of slave plates being selectively arranged between and parallel with the inclined plates forming the flow passages in order to effectively reduce the dimensions of the flow passages and enhance clarifying operation under selected conditions, an inclined end of each slave plate terminating in spaced apart relation from the inclined ends of the inclined clarifier plates adjacent the inlet means for permitting liquid from the inlet means to enter all inclined passages formed between the inclined clarifier plates and the slave plates, each slave plate having a width approximately equal to the width of the parallel spaced apart plates in the clarifier and a length approximately equal the length of the parallel spaced apart clarifier plates, and means for supporting the slave plates between the adjacent clarifier plates, said supporting means being adapted to permit selective insertion of said slave plates into the clarifier in order to form a plurality of inclined flow passages of generally equal area and reduced width between said inclined plates and said slave plates, said supporting means further being adapted to permit selective removal of said slave plates in order to provide flow passages of increased width formed between said inclined plates.

16. The clarifier of claim 15 wherein two slave plates are arranged between each adjacent pair of clarifier plates and further comprising means for supporting the two slave plates in generally even spaced apart relation relative to each other and the adjacent clarifier plates.

* * * * *